United States Patent [19]

Blue et al.

[11] Patent Number: 5,272,591

[45] Date of Patent: Dec. 21, 1993

[54] PROTECTIVE COVER FOR ELECTRICAL BUS BARS

[75] Inventors: Randall L. Blue; Jeffrey O. Sharp, both of Lexington; Michael R. Harris, Winchester; Kim D. Wheeler, Lexington, all of Ky.

[73] Assignee: Square D Company, Palatine, Ill.

[21] Appl. No.: 954,224

[22] Filed: Sep. 30, 1992

[51] Int. Cl.⁵ .............................................. H02B 1/01
[52] U.S. Cl. ................................... 361/622; 361/631; 361/637
[58] Field of Search ................ 361/333, 341, 346–347, 361/350, 353–361, 363, 376

[56] References Cited

U.S. PATENT DOCUMENTS 4,636,915  1/1987  Perkins et al. .................. 361/355
4,916,574  4/1990  Hancock et al. ................. 361/355

Primary Examiner—Gregory D. Thompson
Attorney, Agent, or Firm—Larry I. Golden; Kareem M. Irfan

[57] ABSTRACT

The present invention provides a cover for an exposed bus bar attached to an electrical control device having a contour mounting surface for circuit interrupters. The cover includes a generally planar body member having sufficient size to substantially cover the exposed bus bar. The cover includes means for securing the body to the device so that the position of the body prevents contact between the bus bar and a person's finger or equipment particularly when an individual circuit interrupter is mounted to the device.

14 Claims, 3 Drawing Sheets

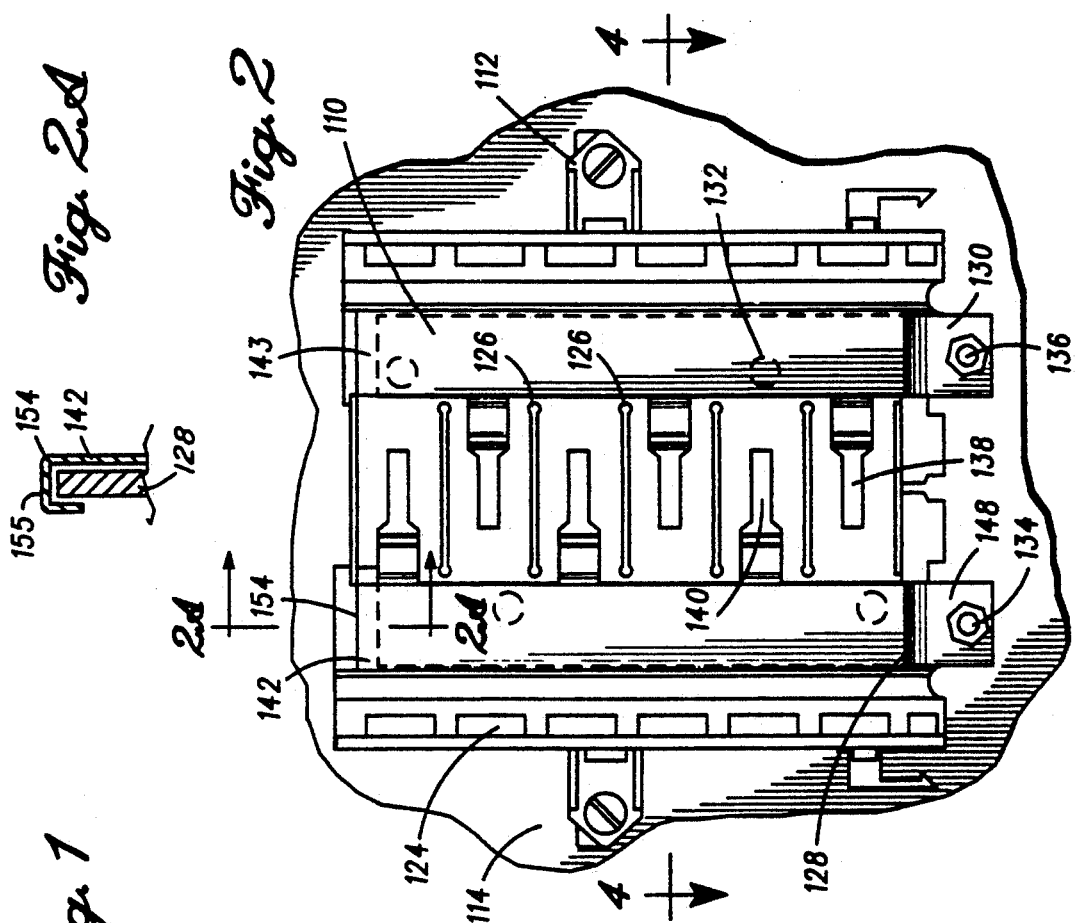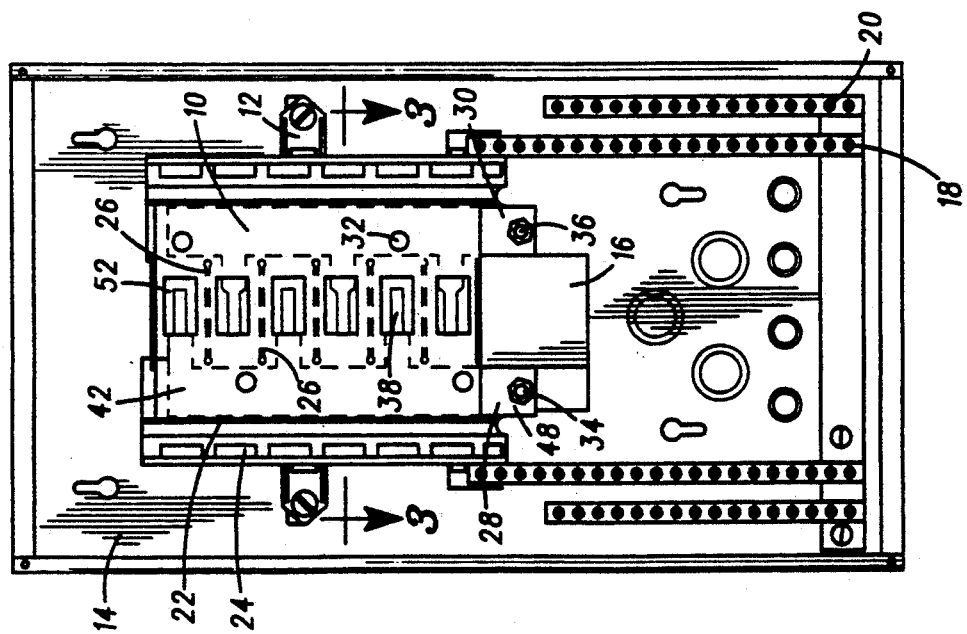

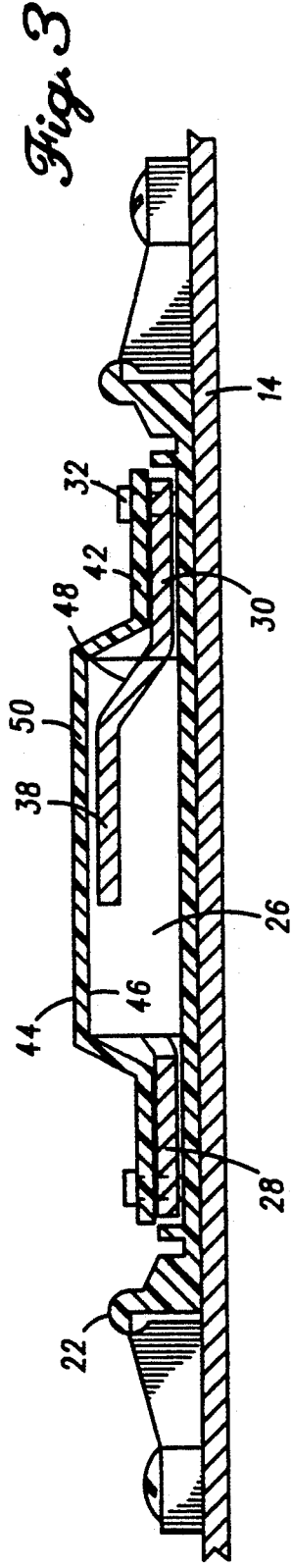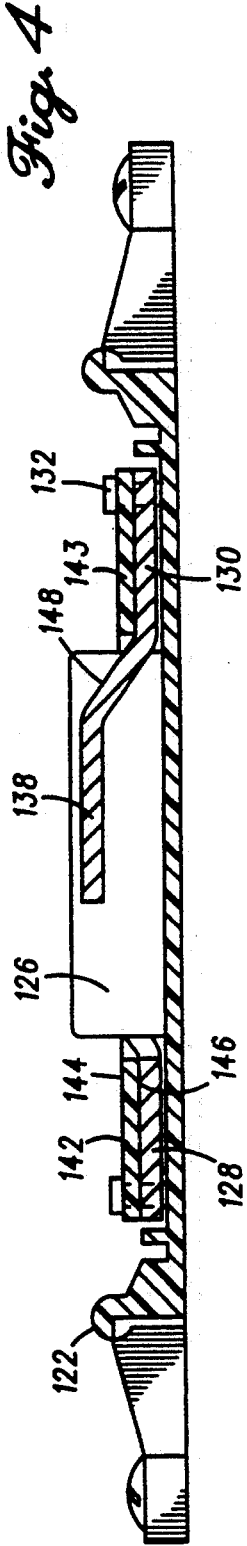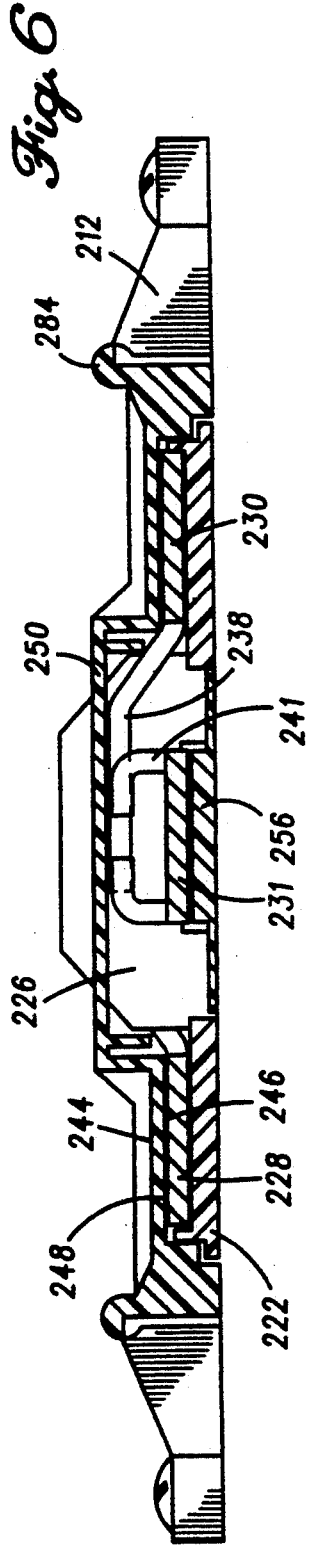

PROTECTIVE COVER FOR ELECTRICAL BUS BARS

RELATED APPLICATION

Related co-pending U.S. application Ser. No. 07/904,844 filed on even date herewith discloses one class of a protective cover apparatus which is suitable for use in the present application. The entire teaching and disclosure of that co-pending application is incorporated herein by reference.

1. Field of the Invention

The present invention relates to panelboards, switchboards, electrical distribution devices, and the like, which have an exposed electrical bus bar and, more particularly, to a cover which protects the exposed bus bar without reference with mounting of individual circuit interrupters.

2. Background of the Invention

Panelboards, switchboards, and other electrical distribution devices are commonly used in residential, commercial, and industrial buildings. Individual circuit interrupters are mounted to these devices to protect branch circuits against overload and fault conditions. Basically, circuit interrupters like circuit breakers and fusible switches comprise a pair of separable contacts, a spring-operated mechanism for effecting separation of the contacts, and a tripping mechanism or fuse which automatically releases the operating mechanism upon the occurrence of an overload or fault condition.

Panelboards and the like are often constructed with bus bars or projecting lugs to form disconnect contacts for the removable individual circuit interrupters. These bus bars and lugs are rigidly attached to the upper surface of the panelboard support molding. Since the bus bars are exposed to the front of the panelboard, it is possible that an operator could be severely burned or shocked if they accidentally touched the terminals while installing the circuit breaker. Furthermore, the main circuit interrupter could be short circuited if conducting material accidentally bridged across the respective bus bars. The bus bars may also be subject to damage during the installation of other components near the panelboard.

In view of the increasing safety requirements for load centers and panelboards already in operation that do not contain a protective apparatus for exposed electrical bus bars, there is a need for a factory and field-installed protective cover that fits the bus bar designs of various manufacture.

SUMMARY OF THE INVENTION

According to the present invention, a cover is provided for an exposed bus bar attached to an electrical distribution device having a contoured surface for mounting a plurality of individual circuit interrupters to control branch circuits. The bus bar is integrally formed with branch stabs for electrically connecting to terminal extending from the circuit interrupter housing. The cover includes a generally planar body member made of electrically-insulating, resilient material having sufficient size to substantially cover the exposed bus bar while allowing access to the bus bar with the terminals of a circuit interrupter. The body has a cross-sectional thickness sufficiently thin to position the body between the bus bar and each circuit interrupter. The body includes a top and a bottom face. The bottom face of the body abuts the top surface of the bus bar. The top face of the body is configured to allow electrical and mechanical connection between the circuit interrupter and the device.

The cover includes means for securing the body to the device so that the position of the body prevents contact between the bus bar and a person's finger or equipment particularly when the individual circuit interrupter is mounted to the device. Preferably, the securing means is manually attached and detached from the device.

On embodiment of the inventive cover is shaped as an elongated strip. The cover is positioned over the main part of the bus bar that interconnects the branch stabs. This embodiment is preferred for field-installation on operating bus bars.

Another embodiment of the inventive cover is a one-piece body covering more than one bus bar. The body is integrally formed with an offset area centered across the width of the body. The offset area bridges the bus bar stabs and the contour of the mounting surface for aligning and mounting the circuit interrupters. The body includes a plurality of apertures centrally located on the offset which extend through the body. The apertures are positioned above the bus bar stabs which electrically connect to the individual circuit interrupters. The apertures are larger than the width of the bus bar stabs and the housing of the circuit interrupters so that the circuit interrupter housing extends below the body to make electrical connection with the bus bar.

A third embodiment of the inventive cover is a one-piece body covering more than one bus bar. The body is integrally formed with an offset area centered across the width of the body. The offset area bridges the bus bar stabs. The body includes a plurality of apertures centrally located on the offset which extend through the body. The apertures are positioned above the bus bar stabs which electrically connect to the individual circuit interrupters. The apertures are smaller than the width of the bus bar stabs and the housing of the circuit interrupters so that the circuit interrupter housing abuts the top face of the body and the circuit interrupter terminals extend through the body to make electrical connection with the bus bar stabs. This embodiment is preferred for use with panelboards utilizing contoured mounting panels such as upstanding dividers to align the circuit interrupters. Then, a second plurality of apertures nest the body around the upstanding dividers.

The present invention also provides an electrical distribution device for controlling electrical service. The device includes a circuit interrupter having a housing with a terminal extending from the housing for electrical connection therewith. A panelboard is also included with an exposed bus bar attached thereto. The panelboard has a contoured surface for mounting the circuit interrupter. The bus bar is formed with branch stabs for electrically connecting to the terminal extending from the circuit interrupter housing. The device further includes a cover and securing means as discussed above.

The present invention also contemplates a method of safely protecting an exposed bus bar attached to an electrical distribution device having a contoured surface for mounting a plurality of circuit interrupters to control branch circuits. The method includes demountably securing a cover to the device so that the position of the cover prevents contact between the bus bar and a person's finger or equipment, particularly, when the individual circuit interrupter is mounted to the device. The cover is manually attached and detaches from the device.

Preferably, the method includes the step of molding the cover with spaced apart securing members adapted to engage the device. The preferred method also includes nesting the cover between the bus bar and the circuit interrupter on the mounting surface of the device.

Accordingly, an object of the present invention is to provide a panelboard or like electrical distribution device which minimizes the exposure of a bus bar or disconnect terminal.

Another object of the invention is to provide a protective cover which can be used with bus bars and other electrical distribution devices which are already operating in the field.

A further object of the invention is to provide a protective cover which does not interfere with the mounting or electrical connection of the circuit interrupter to the panelboard or like device.

Still another object of the invention is to provide a cover which can be manually assembled with a bus bar and, thereafter, manually removed without the need for tools or equipment.

Other and further advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure:

FIG. 1 is a front plan view of one embodiment of a protective cover of this invention which is shown mounted on a panelboard in a load center;

FIG. 2 is a partial front plan view of a second embodiment of a protective cover and panelboard of this invention which is shown mounted on a panelboard;

FIG. 2A is an isolated cross-sectional view along lines 2A—2A in FIG. 2 of another embodiment of the securing means for the protective cover;

FIG. 3 is a cross-sectional view of the panelboard and protective cover along the lines 3—3 in FIG. 1;

FIG. 4 is a cross-sectional view of the panelboard and protective cover along the lines 4—4 in FIG. 2;

FIG. 6 is a cross-sectional view of the panelboard and protective cover in assembled combination along the lines 6—6 in FIG. 5.

DETAILED DESCRIPTION

Figure 5:
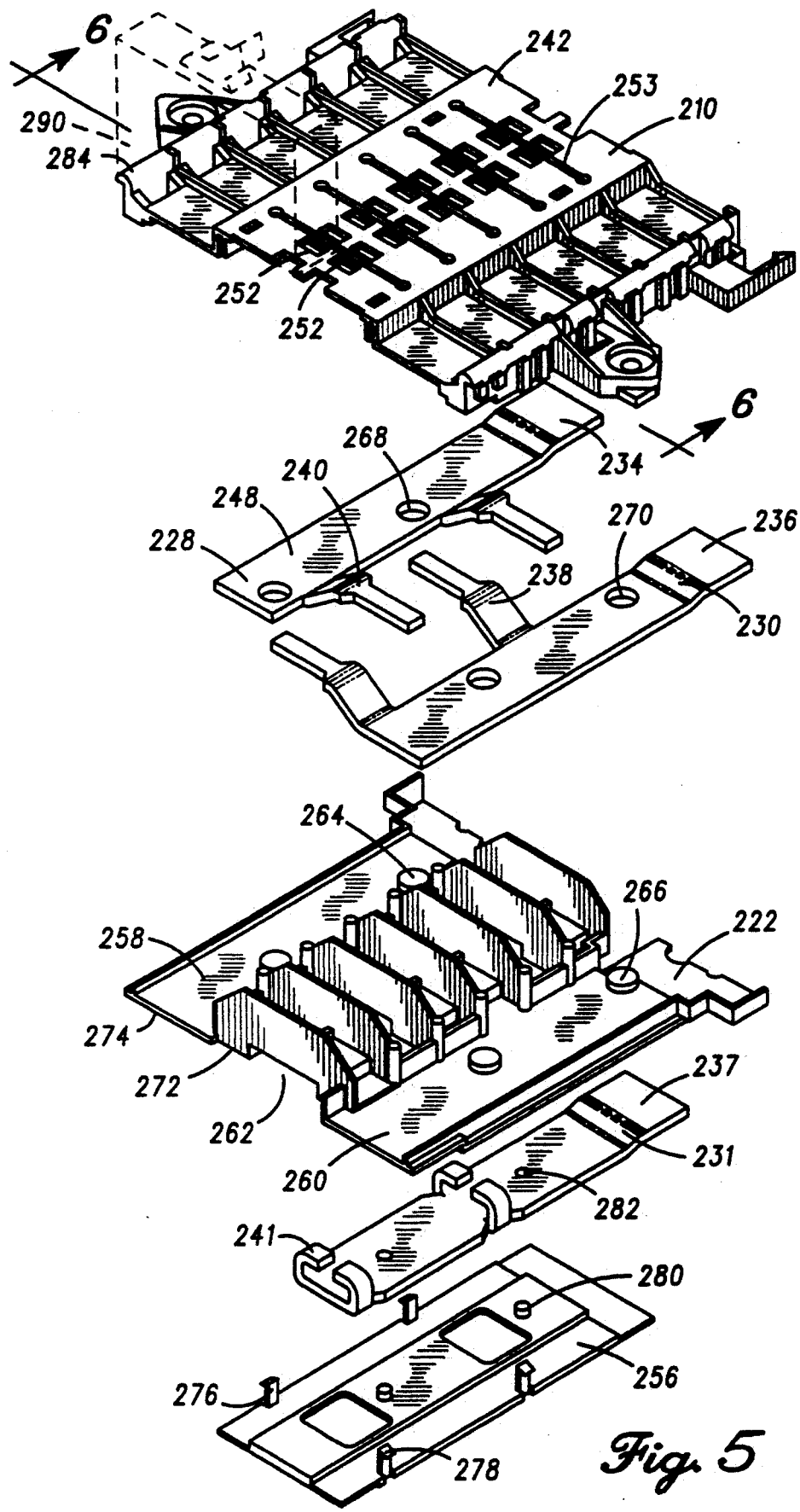
FIG. 5 is an exploded perspective view of a third embodiment of a protective cover of this invention which is shown in disassembled combination with bus bars and a panelboard.

Referring to the drawings, FIGS. 1 and 3 illustrate an embodiment 10 of a cover of the present invention which is shown attached to a panelboard 12 mounted in a housing 14. The interior assembly of the panelboard 12 includes a main breaker 16. Wire terminals, like 18 and 20, offer electrical connection for neutral and branch circuits.

The panelboard 12 provides a mounting support 22 for a plurality of circuit breakers (not shown). The mounting support 22 includes plurality of slots 24 for retention of individual circuit breakers by means of a snap-on rail, spring tabs, hooks or other fastening means. A plurality of upstanding, elongated, parallel dividers 26 are integrally formed with the mounting support 22. The dividers 26 separate the adjacent bridging of a conductive member between circuit breaker terminals of different electric potential.

Bus bars 28 and 30 are attached to the mounting support 22 so that they are accessible from the front face of the panelboard 12. The bus bars 28, 30 are attached to the mounting support 22 by any conventional means such as the fasteners 32 or methods such as heat staking or ultrasonic welding. The ends 34 and 36 of each bus bar provide for electrical connection to their respective circuit.

The bus bars 28 and 30 include a plurality of integral branch stab portions like 38 and 40, respectively. The present invention is also suitable for use with bus bars that are multi-piece units securely together with fasteners. Each of the circuit breakers is attached to one of the branch stabs 38. Preferably, the circuit breaker uses a pair of spring-biased contact jaws as its electrical terminals to make an electrical connection with the stabs 38. The contact jaws flex around each side of the branch stab 38 to retain the branch strap with a spring-like bias in a straddle position. Other mechanical fasteners like screws are also suitable for making the electrical connection between the circuit breaker and the stab 38.

The embodiment 10 provides a generally flat planar body 42 which is of sufficient size to substantially cover the portion of the bus bars 28, 30 exposed to the front face of the panelboard 12. The body 42 is defined by a top face 44 and a bottom face 46. The bottom face 46 of the body abuts the top surface 48 of the bus bars.

The top face 44 of the body is configured to allow electrical and mechanical connection between the circuit breaker and the mounting support 22. The top face 44 of the body does not interfere with the mounting of the individual circuit breakers on the mounting support 22. The cross-sectional thickness of the body 42 is sufficiently thin to position the body 42 between the bus bars 28, 30 and the circuit breakers. The body 42 is layered between the mounting support 22 and the housing of each circuit breaker.

The profile of the body 42 has an offset area 50 to bridge the upstanding dividers 26 of the mounting support. A plurality of apertures 52 are provided through the body 42 in the central area of the offset 50. The apertures 52 are spaced to correspond to the position of the stabs like 38 underneath. Each aperture 52 is of sufficient size to allow the housing of the circuit breaker to pass through the body 42 and allow the circuit breaker contact jaws to electrically and mechanically engage the stab 38 beneath the body 42. Thus, the apertures 52 are larger than the width of the stabs 38.

An important advantage of the present invention is that the circuit breakers can still be mounted to the mounting support 22 without interference from the body 42. One end of the circuit breaker engages the slot 24 in the mounting support. The other end of the circuit breaker passes through the aperture 52 in the body to allow its contact jaw to engage the stab 38 of the bus bar. The upstanding dividers 26 continue to position each circuit breaker during their installation. The offset 50 allows the bottom face 46 of the body to remain in an abutting relationship with the top surface 48 of the bus bar except for the area of the stabs 38 which engage the contact jaw of the circuit breaker. The offset 50 also prevents the top face 44 of the body from interfering with the mounting of the circuit breakers to the mounting support 22. The offset 50 bridges above and across the upstanding dividers 26 so that there is no interference from the body 42 with the positioning of the circuit breaker by the dividers 26.

The body 42 is secured to the bus bars 28, 30 by fasteners 32 so that the position of the body 42 prevents contact between the bus bars 28, 30 and a person's finger or equipment particularly when the individual circuit breaker is mounted to the mounting support 22. The present invention is not limited to securing the body 42 to the bus bars 28, 30. Alternately, the body 42 can be secured to other parts of the panelboard 12 as long as the position of the body 42 over the bus bars 28, 30 provides the intended protection.

Securing means other than fasteners 32 are contemplated by the invention or securing the body 42 to the bus bars 28, 30 or other parts of the panelboard 12. For instance, the body 42 can be detachably clipped with a securing member to the mounting support 22.

Referring now to FIGS. 2 and 4, a second embodiment 110 of a cover of the present invention is shown attached to a panelboard 112 mounted in a housing 114. The panelboard 112 provides a mounting support 122 for a plurality of circuit breakers (not shown). The mounting support 122 includes plurality of slots 124 for retention of individual circuit breakers by means of spring tabs, hooks or other fastening means. A plurality of upstanding, elongated, parallel dividers 126 are integrally formed with the mounting support 122. The dividers 126 separate the adjacent circuit breakers and reduce the probability of accidental bridging of a conductive member between circuit breaker terminals of different electric potential.

Bus bars 128 and 130 are attached to the mounting support 122 so that they are accessible from the front face of the panelboard 112. The bus bars 128, 130 are attached to the mounting support 122 by any conventional means such as the fasteners 132 or methods such as heat staking or ultrasonic welding. The ends 134, 136 or each bus bar provide for electrical connection to their respective circuit.

The bus bars 128 and 130 include a plurality of integral branch stab portions like 138 and 140, respectively. Each of the circuit breakers is attached to one of the branch stabs 138. Preferably, the circuit breaker uses a pair of spring-biased contact jaws as its terminals to make an electrical connection with the stabs 138. The contact jaws flex around each side of the branch stab 138 to retain the branch stab with a spring-like bias in a straddle position. Other mechanical fasteners, like screws, are also suitable for making the electrical connection between the circuit breaker and the stab 138.

The embodiment 110 provides a pair of generally flat planar bodies 142, 143 which are of sufficient size to substantially respectively cover the main portion of the bus bars 128, 130 exposed to the front face of the panelboard 112. Each body 142 is defined by a top face 144 and a bottom face 146. The bottom face 146 of the body abuts the top surface 148 of the bus bars.

The top face 144 of the body is shaped to allow electrical and mechanical connection between the circuit breaker an the mounting support 122. The top face 144 of the body does not interfere with the mounting of the individual circuit breakers on the mounting support 122. The cross-sectional thickness of each body 142, 143 is sufficiently thin to position each body 142, 143 between the bus bars 128, 130 and the circuit breakers. Each body 142, 143 is layered between the mounting support 122 and the circuit breaker housing.

In the embodiment 110, the bodies 142, 143 covering each bus bar 128, 130 are not connected with one another. The stabs 138 and the upstanding dividers 126 are exposed for positioning the circuit breaker and allowing the circuit breaker contact jaws to electrically and mechanically engage the stab 138.

One of the important advantages of the present invention is similarly incorporated in this embodiment 110. The circuit breakers are still mounted to the mounting support 122 without interference from each body 142, 143. One end of each circuit breaker engages the slots 124 in the mounting support. The other end of the circuit breaker is positioned by the upstanding dividers 126 and engages its contact jaw with the stab 138 of the bus bar. The bottom face 146 of each body remains in an abutting relationship with the bus bar 128. The contour of the top face 144 of the body does not interfere with the mounting of the circuit breakers to the mounting support 122.

Each body 142, 143 is secured to the bus bar 128, 130 by means so that the position of the body 142, 143 prevents contact between the bus bar 128, 130 and a person's finger or equipment particularly when the individual circuit breaker is mounted to the mounting support 122. Preferably, the body like 142 is simply heat-staked with a projection through the bus bar 128 and the mounting support 122.

The present invention also contemplates other securing means. For example, the body 142 can be detachably secured to the bus bar 128 by having a clip 155 shown in FIG. 2A, from one end 154 of the body to form a U-shaped channel of a pre-determined size to fit over the end of the bus bar 128 with a press-fit engagement. This type of securing means is desirable since it allows the cover to be added to bus bars and panelboards already operating in the field. Conventional fasteners, like screws, are also suitable for use as a securing means between the bus bar 128 and the body 142.

Referring now to FIGS. 5 and 6, a third embodiment 210 of a cover of the present invention is respectively shown disassembled and assembled with a panelboard 212. The components of the panelboard 212 include a mounting support 222 for a plurality of circuit breakers such as 290 and a back shield 256 for one of a plurality of bus bars. The mounting support 222 includes plurality of upstanding, elongated, parallel dividers 226 integrally formed therewith. The dividers 226 separate the adjacent circuit breakers and reduce the probability of accidental bridging of a conductive member between circuit breaker terminals of different electric potential.

Bus bars 228, 230, and 231 are attached to the mounting support 222 so that they are accessible from the front face of the panelboard 212. The bus bars 228, 230, 231 are aligned in their respective positions by channels 258, 260, and 262 integrally formed in the mounting support 222. Each channel 258, 260 contains projections like 264 and 266, respectively, which mate with corresponding holes 268, 270 in the bus bars 228, 230. The ends 234, 236, and 237 of each bus bar provide for electrical connection to their respective circuit.

The back shield 256 nests into a second channel 272 formed in the back face 274 of the mounting support so that it is flush when the back shield 256 is assembled with the mounting support 222. The back shield 256 is formed with prongs 276 which extend perpendicularly upward to engage the mounting support 222. The distal end of the prong 276 incorporates a flange 276 to extend through a hole (not shown) in the mounting support 222 and engage the edge defining the hole. The prong 276 is spring biased to allow detachment from the edge of the hole by bending the prong 276 back. The back shield 256 also includes projections 280 which mate with corresponding holes 282 in the bus bar 231 to retain the bus bar in alignment.

The invention contemplates reversing the positions of the prong and hole used as the securing means. In this arrangement, the prongs extend from the mounting support 222 to engage the edge defining a hole in the back shield 256.

The bus bars 228, 230, 231 include a plurality of integral branch stab portions like 238, 240, and 241, respectively. Each of the circuit breakers is attached to one of the branch stabs 238. Preferably, the circuit breaker uses a pair of spring-biased contact jaws as its electrical terminals to make an electrical connection with the stabs 238. The contact jaws flex around each side of the branch stab 238 to retain the branch stab with a spring-like bias in a straddle position. Other mechanical fasteners like screws are also suitable for making the electrical connection between the circuit breaker and the stab 238.

The embodiment provides a generally flat planar body 242 which is of sufficient size to substantially cover the portion of the bus bars 228, 230, 231 exposed to the front face of the panelboard 212. The body 242 is defined by a top face 244 and a bottom face 246. The bottom face 246 of the body abuts the top surface 248 of the bus bars.

The top face 244 of the body is configured to allow electrical and mechanical connection between the circuit breaker and the mounting support 222. The top face 244 of the body does not interfere with the mounting of the individual circuit breakers on the mounting support 222. The cross-sectional thickness of the body 242 is sufficiently thin to position the body 242 between the bus bars 228, 230, 231 and the circuit breakers. The body 242 is layered or nested between the mounting support 222 and the housing of the circuit breaker.

The profile of the body 242 has a slight offset 250 to conform in contour with the raised branch stab like 238. A first plurality of apertures 252 is provided through the body 242 in the central area of the offset 250. The apertures 252 are spaced to correspond to the position of the stabs, like 238, beneath the plane of the body 242. Each aperture 252 is of sufficient size to allow a contact jaw of the circuit breaker to pass through the body 242 and engage electrically and mechanically with the stab 238 beneath the plane of the body 242. Thus, the apertures 252 are only slightly larger than an individual contact jaw of the circuit breaker.

A second plurality of thin, elongated apertures 253 is provided through the body and aligned across the width of the panelboard 212. The second apertures 253 are spaced to correspond to the position of the upstanding dividers 226. Each of the second apertures 253 is shaped to allow an upstanding divider 226 to pass through the body 242 and nest the body around the divider 226.

An important advantage of the present invention is that the circuit breakers can still be mounted to the mounting support 222 without interference from the body 242. During installation, one end of the circuit breaker engages a rail 284 integrally formed with the body 242. The other end of the circuit breaker passes through the apertures 252 in the body to allow each pair of the circuit breaker contact jaws to engage the stab 238 of the bus bar. The upstanding dividers 226 continue to position the circuit breakers during this mounting process. The offset 250 allows the bottom face 246 of the body to remain in an abutting relationship with the bus bar 228 and in close proximity to, if not abutting, the stabs 238. The offset 250 also prevents the top face 248 of the body from interfering with the mounting of the circuit breakers to the mounting support 222. The offset 250 nests around the upstanding dividers 226 so that there is no interference by the body 242 with the positioning of the circuit breaker by the dividers 226.

The body 242 includes prongs (now shown) as securing members which engage correspondingly spaced holes in the mounting support 222 in a fashion similar to the attachment of the back shield 256 to the mounting support 222. The body 242 nests with the mounting support 222 to secure the bus bars 228, 230 therebetween so that the position of the body 242 prevents contact between the bus bar and a person's finger or equipment particularly when the individual circuit breaker is mounted. As discussed above, other means of securing the bus bars in position are contemplated for use with this embodiment 210 of the invention.

As discussed above, the present invention also provides a method of safely protecting an exposed bus bar attached to an electrical distribution device having a contoured surface for mounting a plurality of individual circuit interrupters to control branch circuits. The method includes demountably securing a cover to the device so that the position of the cover prevents contact between the bus bar and a person's finger or equipment particularly when the individual circuit interrupter is mounted to the device. The cover is manually attached and detached to the device.

Preferably, the cover is molded with spaced apart securing members like the U-shaped channel on the end 154 of the body or the prongs 276 as best illustrated in FIG. 5. As discussed, the cover is nested between the bus bar and the circuit interrupter on the mounting surface.

Preferably, the cover of the present invention is made of a resilient, electrically insulating thermoplastic such as NORYL SE-1 made by General Electric Company. Conventional plastic forming processes such as injection molding are contemplated for use in making covers of the present invention.

The present invention is specifically disclosed for sue with one, two, and three pole circuit breakers manufactured by the Square D Company under the catalog designation QO circuit breakers. These circuit breakers are utilized in QO (registered trademark of the Square D Company) load centers which were originally introduced to the marketplace over 35 years ago and have been continually updated.

As those skilled in the art will appreciate, the inventive cover can be adapted and configured for usage with a wide variety of bus bars and other electrical distribution devices. Adapting the shape of the cover to utilize features of a mounting support and other components of a panelboard to unobtrusively secure the cover thereto allows upgrading the safety of bus bars already in the marketplace.

It will be further understood that whereas a panelboard is illustrated, the term electrical distribution device is defined to include load centers, switchboards and other types of control units. Although the above discussion of the present invention has focused on circuit breakers other types of circuit interrupters such as fusible switches and the like are contemplated for use with the inventive covers. Likewise, the inventive covers can be adapted to protect the exposed bus bars of single or multi-phase panelboards.

While particular embodiments and applications of the present applications of the present invention has been illustrated and described, it is to be understood that the invention is not limited to the precise construction and compositions disclosed herein and that various modifications, changes, and variations which will be apparent to those skilled in the art may be made in the arrangement, operation, and details of construction of the invention disclosed herein without departing form the spirit and scope of the invention as defined in the appended claims.

What is claimed is:

1. A cover for a plurality of exposed bus bars attached to an electrical distribution device having a contoured surface for mounting a plurality of individual circuit interrupters to control branch circuits, each bus bar formed with branch stabs for electrically connecting to terminals extending from the housing of each circuit interrupter, the cover comprising:

a generally planar body member made of electrically-insulating, resilient material having sufficient size to substantially cover the exposed bus bars while allowing access to the bus bars with the terminals of each circuit interrupter, the body having a cross-sectional thickness sufficiently thin to position the body between the bus bars and each circuit interrupter, the body having a top and a bottom face, the bottom face of the body adapted to abut the top surface of the bus bars, and top face of the body being configured to allow electrical and mechanical connection between each circuit interrupter and the device, the body having an offset area integrally formed therewith, the offset area which extend through the body, the apertures being positioned above the bus bar stabs which electrically connect to each circuit interrupter, the apertures being larger than the width of the bus bar stabs and the housing of each circuit interrupter so that each circuit interrupter housing extends below the body to make electrical connection with one of the bus bars, the body further having two rails integrally formed therewith, each rail upstanding from the top face of the body and extending along the edge of the top face parallel to length of the offset area, the rails adapted to removably engage one end of each circuit interrupter; and means for securing the body to the device so that the position of the body prevents contact between the bus bar stabs and a person's finger or equipment particularly when each individual circuit interrupter is mounted to the device.

2. The cover of claim 1 wherein the cover is made of a thermoplastic material.

3. A cover for an exposed bus bar attached to an electrical distribution device having a contoured surface for mounting a plurality of individual circuit interrupters to control branch circuits, the bus bar formed with branch stabs for electrically connecting to terminals extending from the housing of each circuit interrupter, the cover comprising:

a generally planar body member made of electrically-insulating, resilient material having sufficient size to substantially cover the exposed bus bar while allowing access to the bus bar with the terminals of each circuit interrupter, the body having a cross-sectional thickness sufficiently thin to position the body between the bus bar and each circuit interrupter, the body having a top and a bottom face, the bottom face of the body adapted to abut the top surface of the bus bar, the top face of the body being configured to allow electrical and mechanical connection between each circuit interrupter and the device, means for securing the body to the device so that the position of the body prevents contact between the bus bar stabs and a person's finger or equipment particularly when each individual circuit interrupter is mounted to the device, the securing means includes a fastener located at one end of the body, the fastener having a clip extending perpendicularly from the bottom face with a flange located on the distal end thereof, the flange forming a U-shaped channel, the channel adapted for fitting over one end of the bus bar and for creating a press-fit engagement with the bus bar to retain the cover in position.

4. A cover for a plurality of exposed bus bars attached to an electrical distribution device having a contoured surface for mounting a plurality of individual circuit interrupters to control branch circuits, each bus bar formed with branch stabs for electrically connecting to terminals extending from the housing of each circuit interrupter, the cover comprising:

a generally planar body member made of electrically-insulating, resilient material having sufficient size to substantially cover the bus bars while allowing access to the bus bars with the terminals of each circuit interrupter, the body having a cross-sectional thickness sufficiently thin to position the body between each bus bar and each circuit interrupter, the body having a top and a bottom face, the bottom face of the body adapted to abut the top surface of the bus bar, the top face of the body being configured to allow electrical and mechanical connection between each circuit interrupter and the device, the body being integrally formed with an offset area centered across the width of the body, the offset area being adapted to bridge the bus bar stabs and the contour of the mounting surface for aligning and mounting each circuit interrupter, the body having a plurality of apertures centrally located on the offset which extend through the body, the apertures being positioned on both sides of each bus bar stab while leaving the body to cover each bus bar stab itself, the size of each aperture being adapted to accommodate one of the circuit interrupter terminals therethrough so that each circuit interrupter terminal extends below the body to make electrical connection with one of the bus bars; and means for securing the body to the device so that the position of the body prevents contact between the bus bar stabs and a person's finger or equipment particularly when each individual circuit interrupter is mounted to the device.

5. The cover of claim 4 wherein the bottom face of the body in the offset area is adapted to abut the upper surface of each bus bar stab.

6. A cover for a plurality of exposed bus bars attached to an electrical distribution device having a contoured surface for mounting a plurality of individual circuit interrupters to control branch circuits, each bus bar formed with branch stabs for electrically connecting to terminals extending from the housing of each circuit interrupter, the cover comprising:

a generally planar body member made of electrically-insulating, resilient material having sufficient size to substantially cover the bus bars mounted to the device while allowing access to the bus bars with the terminals of each circuit interrupter, the body having a cross-sectional thickness sufficiently thin to position the body between the bus bars and each circuit interrupter, the body having a top and a bottom face, the bottom face of the body adapted to abut the top surface of the bus bars, the top face of the body being configured to allow electrical and mechanical connection between each circuit interrupter and the device, the body being integrally formed with an offset area centered across the width of the body, the offset area being adapted to bridge the bus bar stabs, the body having a first plurality of apertures centrally located on the offset which extend through the body, the first plurality of apertures being positioned above the bus bar stabs which electrically connect to each individual circuit interrupter, the first plurality of apertures being smaller than the width of the bus bar stabs and the housing of each circuit interrupter so that each circuit interrupter housing abuts the top face of the body and each circuit interrupter terminal extends through the body to make electrical connection with one of the bus bars, the body further having a second plurality of apertures located on the offset area which extend through the body, the second plurality of apertures being adapted to correspond in configuration and position to the contour mounting surface to allow the mounting surface to extend through the body so that the body is layered between each bus bar stab and each circuit interrupter without interfering with the electrical connection therebetween; and means for securing the body to the device so that the position of the body prevents contact between the bus bar stabs and a person's finger or equipment particularly when each individual circuit interrupter is mounted to the device.

7. An electrical distribution device for controlling electrical service, the device comprising:

a plurality of circuit interrupters having a housing with a terminal extending from the housing for electrical connection therewith;

a panelboard having a plurality of exposed bus bars attached thereto, the panelboard having a contoured surface for mounting each circuit interrupter, the bus bars being formed with branch stabs for electrically connecting to terminals extending from the housing of each circuit interrupter; and a cover having a generally planar body member made of electrically-insulating, resilient material, the body having sufficient size to substantially cover the exposed bus bars while allowing access to the bus bars with the terminals of each circuit interrupter, the body having a cross-sectional thickness sufficiently thin to position the body between the bus bar and each circuit interrupter, the body having a top and a bottom face, the bottom face of the body being adapted to abut the top surface of the bus bars, the top face of the body being configured to allow electrical and mechanical connection between each circuit interrupter and the device, the body having an offset area integrally formed therewith, the offset area being centered across the width of the body, the offset area being adapted to bridge the bus bar stabs and the contour of the mounting surface for aligning and mounting each circuit interrupter, the body having a plurality of apertures centrally located on the offset area which extend through the body, the apertures being positioned above the bus bar stabs which electrically connect to each circuit interrupter, the apertures being larger than the width of the bus bar stabs and the housing of each circuit interrupter so that each circuit interrupter housing extends below the body to make electrical connection with one of the bus bars, the body further having two rails integrally formed therewith, each rail upstanding from the top face of the body and extending along the edge of the top face parallel to length of the offset area, the rails adapted to removably engage one end of each circuit interrupter; and means for securing the body to the device so that the position of the body prevents contact between the bus bar stabs and a person's finger or equipment particularly when each individual circuit interrupter is mounted to the device.

8. The device of claim 7 wherein the cover is made of a thermoplastic material.

9. The device of claim 7 wherein the circuit interrupter is a circuit breaker.

10. The device of claim 7 wherein the circuit interrupter is a fusible switch.

11. An electrical distribution device for controlling electrical service, the device comprising:

a plurality of circuit interrupters having a housing with a terminal extending from the housing for electrical connection therewith;

a panelboard having an exposed bus bar attached thereto, the panelboard having a contoured surface for mounting each circuit interrupter, the bus bar being formed with branch stabs for electrically connecting to the terminal extending from the housing of each circuit interrupter; and a cover having a generally planar body member made of electrically-insulating, resilient material, the body having sufficient size to substantially cover the exposed bus bar while allowing access to the bus bar with the terminals of each circuit interrupter, the body having a cross-sectional thickness sufficiently thin to position the body between the bus bar and each circuit interrupter, the body having a top and a bottom face, the bottom face of the body being adapted to the top surface of the bus bar, the top face of the body being configured to allow electrical and mechanical connection between each circuit interrupter and the device, means for securing the body to the device so that the position of the body prevents contact between the bus bar stabs and a person's finger or equipment particularly when each individual circuit interrupter is mounted to the device, the securing means includes a fastener located at one end of the body, the fastener having a clip extending perpendicularly from the bottom face with a flange located on the distal end thereof, the flange forming a U- shaped channel, the channel adapted for fitting over one end of the bus bar and for creating a press-fit engagement with the bus bar to retain the cover in position.

12. An electrical distribution device for controlling electrical service, the device comprising:
   a plurality of circuit interrupters having a housing with a terminal extending from the housing for electrical connection therewith;
   a panelboard having a plurality of exposed bus bars attached thereto, the panelboard having a contoured surface for mounting each circuit interrupter, the bus bars being formed with branch stabs for electrically connecting to the terminal extending from the housing of each circuit interrupter; and
   a cover having a generally planar body member made of electrically-insulating, resilient material, the body having sufficient size to substantially cover the exposed bus bars while allowing access to the bus bars with the terminals of each circuit interrupter, the body having a cross-sectional thickness sufficiently thin to position the body between the bus bar and each circuit interrupter, the body having a top and a bottom face, the bottom face of the body being adapted to the top surface of the bus bars, the top face of the body being configured to allow electrical and mechanical connection between each circuit interrupter and the device,
   the body being integrally formed with an offset area centered across the width of the body, the offset area being adapted to bridge the bus bar stabs and the contour of the mounting surface for aligning and mounting each circuit interrupter, the body having a plurality of apertures centrally located on the offset which extend through the body, the apertures being positioned on both sides of each bus bar stab while leaving the body to cover each bus bar stab itself, the size of each aperture being adapted to accommodate one of the circuit interrupter terminals therethrough so that each circuit interrupter terminal extends below the body to make electrical connection with one of the bus bars; and
   means for securing the body to the device so that the position of the body prevents contact between the bus bars and a person's finger or equipment particularly when each individual circuit interrupter is mounted to the device.

13. The device of claim 12 wherein the bottom face of the body in the offset area is adapted to abut the upper surface of each bus bar stab.

14. An electrical distribution device for controlling electrical service, the device comprising:
   at least one circuit interrupter having a housing with a terminal extending from the housing for electrical connection therewith;
   a panelboard having a plurality of exposed bus bars attached thereto, the panelboard having a contoured surface for mounting each circuit interrupter, the bus bars being formed with branch stabs for electrically connecting to the terminal extending from the housing of each circuit interrupter; and
   a cover having a generally planar body member made of electrically-insulating, resilient material having sufficient size to substantially cover the bus bars mounted to the device while allowing access to the bus bars with the terminals of each circuit interrupter, the body having a cross-sectional thickness sufficiently thin to position the body between the bus bars and each circuit interrupter, the body having a top and a bottom face, the bottom face of the body adapted to abut the top surface of the bus bars, the top face of the body being configured to allow electrical and mechanical connection between each circuit interrupter and the device, the body being integrally formed with an offset area centered across the width of the body, the offset area being adapted to bridge the bus bar stabs,
   the body having a first plurality of apertures centrally located on the offset which extend through the body, the first plurality of apertures being positioned above the bus bar stabs which electrically connect to each individual circuit interrupter, the first plurality of apertures being smaller than the width of the bus bar stabs and the housing of each circuit interrupter so that each circuit interrupter housing abuts the top face of the body and each circuit interrupter terminal extends through the body to make electrical connection with one of the bus bars,
   the body further having a second plurality of apertures located on the offset area which extend through the body, the second plurality of apertures being adapted to correspond in configuration and position to the contour mounting surface to allow the mounting surface to extend through the body so that the body is layered between each bus bar stab and each circuit interrupter without interfering with the electrical connection therebetween; and
   means for securing the body to the device so that the position of the body prevents contact between the bus bar stabs and a person's finger or equipment particularly when each individual circuit interrupter is mounted to the device.

* * * * *